United States Patent
Chen et al.

(10) Patent No.: US 6,566,569 B1
(45) Date of Patent: May 20, 2003

(54) CONVERSION OF REFINERY $C_5$ PARAFFINS INTO $C_4$ AND $C_6$ PARAFFINS

(75) Inventors: Cong-Yan Chen, Kensington, CA (US); Dennis J. O'Rear, Petaluma, CA (US); Scott R. Brundage, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 09/603,489

(22) Filed: Jun. 23, 2000

(51) Int. Cl.$^7$ ............... C07C 5/00; C07C 6/08; C07C 5/22; C10G 45/00; C10G 51/02
(52) U.S. Cl. ............. 585/324; 585/708; 585/253; 585/275; 585/331; 585/656; 585/664; 585/734; 208/57; 208/49
(58) Field of Search .................. 585/208, 253, 585/275, 324, 331, 656, 664, 734; 208/57, 49

(56) References Cited

U.S. PATENT DOCUMENTS

| | | |
|---|---|---|
| 2,882,244 A | 4/1959 | Milton |
| 3,130,007 A | 4/1964 | Breck |
| 3,216,789 A | 11/1965 | Breck |
| 3,308,069 A | 3/1967 | Wadlinger et al. |
| 3,415,736 A | 12/1968 | Ciric |
| 3,415,737 A | 12/1968 | Kluksdahl |
| 3,484,499 A | 12/1969 | Lester et al. |
| 3,546,102 A | 12/1970 | Bertolacini et al. |
| 3,574,092 A | 4/1971 | Mitsche |
| 3,668,268 A | 6/1972 | Mulaskey |
| 3,668,269 A | 6/1972 | Chloupek |
| 3,679,575 A | 7/1972 | Bertolacini |
| 3,692,470 A | 9/1972 | Ciric |
| 3,699,035 A | 10/1972 | Hughes et al. |
| 3,702,886 A | 11/1972 | Argauer et al. |
| 3,709,979 A | 1/1973 | Chu |
| 3,728,410 A | 4/1973 | Hughes |
| 3,773,845 A | 11/1973 | Hughes |
| 3,775,505 A | 11/1973 | Hughes |
| 3,784,622 A | 1/1974 | Hughes |
| 3,808,285 A | 4/1974 | Hughes |
| 3,832,449 A | 8/1974 | Rosinski et al. |
| 3,852,207 A | 12/1974 | Stangeland et al. |
| 3,856,876 A | 12/1974 | Burnett |
| RE28,341 E | 2/1975 | Wadlinger et al. |
| 3,864,417 A | 2/1975 | Hughes |
| 3,904,513 A | 9/1975 | Fischer et al. |
| 3,914,330 A | 10/1975 | Hughes |
| 3,953,537 A | 4/1976 | Chloupek et al. |
| 3,972,983 A | 8/1976 | Ciric |
| 4,016,245 A | 4/1977 | Plank et al. |
| 4,018,711 A | 4/1977 | Bertolacini |
| 4,076,842 A | 2/1978 | Plank et al. |
| 4,104,320 A | 8/1978 | Bernard et al. |
| RE29,948 E | 3/1979 | Dwyer et al. |
| 4,157,294 A | 6/1979 | Iwao et al. |
| 4,241,036 A | 12/1980 | Flanigen et al. |
| 4,310,440 A | 1/1982 | Wilson et al. |
| 4,347,121 A | 8/1982 | Mayer et al. |
| 4,347,394 A | 8/1982 | Detz et al. |
| 4,370,224 A | 1/1983 | Eberly, Jr. et al. |
| 4,401,556 A | 8/1983 | Bezman et al. |
| 4,417,083 A | 11/1983 | Bernard et al. |
| 4,434,311 A | 2/1984 | Buss et al. |
| 4,440,871 A | 4/1984 | Lok et al. |

(List continued on next page.)

FOREIGN PATENT DOCUMENTS

| | | |
|---|---|---|
| EP | 0 353 915 A2 | 2/1990 |
| EP | 0 498 182 A1 | 8/1992 |
| GB | 1 117 568 | 6/1968 |
| WO | 94/10106 | 5/1994 |

OTHER PUBLICATIONS

*Petroleum & Petrochemical International*, "New Japanese processes promise cheaper styrene and xylene", (1972), vol. 12, No. 12, pp. 3, 64–68.

Kresge et al, "Ordered mesoporous molecular sieves synthesized by a liquid–crystal template mechanism", *Letters to Nature*, vol. 359, (1992), pp. 710–712.

Beck et al, "A New Family of Mesoporous Molecular Sieves Prepared with Liquid Crystal Templates", *Journal of the American Chemical Society*, (1992), vol. 114, No. 27, pp. 10834–10842.

Little, "Catalytic Reforming", *PennWell Books*, pp. v–vi, ix–xviii, 1–234.

Hughes,, Thomas R., et al., *Molecular Redistribution of Alkanes and Alkylbenzenes,*, pp. 1217–1228 (publication unknown).

Burnett, Robert L., et al., *Mechanism and Poisoning of the Molecular Redistribution Reaction of Alkanes with a Dual–Functional Catalyst System*, Journal of Catalysis 31, pp. 55–64 (1973).

*Primary Examiner*—Thuan Dang
(74) *Attorney, Agent, or Firm*—Steven H. Roth

(57) ABSTRACT

A process for preparing a $C_{4-}$ product stream and a $C_6+$ product stream is disclosed. The process involves contacting a $C_5$ containing paraffinic feedstock with a catalyst that includes a hydrogenation/dehydrogenation catalyst and an olefin metathesis catalyst under conditions which dehydrogenate the paraffins to olefins. The olefins are then metathesized and rehydrogenated to provide a product stream. A $C_{4-}$ fraction and a $C_6+$ fraction can each be isolated from the product stream. The $C_{4-}$ fraction can be used, for example, in an alkylation reaction to provide compounds useful in gasoline compositions. Unconverted $C_5$ paraffins can be recycled. The $C_6+$ fraction can be used, for example, as solvents. Alternatively, they can be isomerized to form gasoline additives, or can be converted to aromatic compounds via reforming, for example, using conventional reforming techniques, preferably using the AROMAX™ process or traditional rheniforming conditions.

21 Claims, No Drawings

U.S. PATENT DOCUMENTS

| | | |
|---|---|---|
| 4,447,316 A | 5/1984 | Buss |
| 4,456,527 A | 6/1984 | Buss et al. |
| 4,500,651 A | 2/1985 | Lok et al. |
| 4,530,824 A | 7/1985 | Arika et al. |
| 4,534,853 A | 8/1985 | Long et al. |
| 4,544,143 A | 10/1985 | Cooper et al. |
| 4,544,539 A | 10/1985 | Wortel |
| 4,552,731 A | 11/1985 | Vaughan |
| 4,556,477 A | 12/1985 | Dwyer |
| 4,567,029 A | 1/1986 | Wilson et al. |
| 4,585,747 A | 4/1986 | Valyocsik |
| 4,634,518 A | 1/1987 | Buss et al. |
| 4,676,885 A | 6/1987 | Bush |
| 4,681,865 A | 7/1987 | Katsuno et al. |
| 4,686,093 A | 8/1987 | Flanigen et al. |
| 4,761,512 A | 8/1988 | Katsuno et al. |
| 4,810,357 A | 3/1989 | Chester et al. |
| 4,820,402 A | 4/1989 | Partridge et al. |
| 4,827,667 A | 5/1989 | Jarvis |
| 4,834,977 A | 5/1989 | Kohama et al. |
| 4,859,422 A | 8/1989 | Qureshi et al. |
| 4,910,006 A | 3/1990 | Zones et al. |
| 4,913,799 A | 4/1990 | Gortsema et al. |
| 4,963,337 A | 10/1990 | Zones |
| 4,973,785 A | 11/1990 | Lok et al. |
| 5,053,373 A | 10/1991 | Zones |
| 5,059,567 A | 10/1991 | Linsten et al. |
| 5,073,530 A | 12/1991 | Bezman et al. |
| 5,073,652 A | 12/1991 | Katsuno et al. |
| 5,091,351 A | 2/1992 | Murakawa et al. |
| 5,106,801 A | 4/1992 | Zones et al. |
| 5,114,563 A | 5/1992 | Lok et al. |
| 5,158,665 A | 10/1992 | Miller |
| 5,198,203 A | 3/1993 | Kresge et al. |
| 5,200,377 A | 4/1993 | Zones et al. |
| 5,202,014 A | 4/1993 | Zones et al. |
| 5,246,689 A | 9/1993 | Beck et al. |
| 5,254,514 A | 10/1993 | Nakagawa |
| 5,316,753 A | 5/1994 | Kakagawa |
| 5,334,368 A | 8/1994 | Beck et al. |
| 5,354,933 A | 10/1994 | Ohashi et al. |
| 5,437,855 A | 8/1995 | Valyocsik |
| 5,491,119 A | 2/1996 | Verduijn |
| 5,514,362 A | 5/1996 | Miller |
| 5,558,851 A | 9/1996 | Miller |
| 5,559,068 A | 9/1996 | Chen et al. |
| 5,580,540 A | 12/1996 | Nakagawa |
| 5,591,421 A | 1/1997 | Zones |
| 5,624,657 A | 4/1997 | Vaughan |
| 5,939,044 A | 8/1999 | Nakagawa et al. |
| 5,968,868 A | 10/1999 | Tajima et al. |

CONVERSION OF REFINERY $C_5$ PARAFFINS INTO $C_4$ AND $C_6$ PARAFFINS

FIELD OF THE INVENTION

This invention relates to the production of hexanes and butanes from a predominantly $C_{5-}$ paraffinic feedstock.

BACKGROUND OF THE INVENTION

Regulations for gasoline are changing and MTBE may be phased out and replaced by more volatile ethanol. If this happens, other volatile components in gasoline, for example pentanes, will have to be removed in order to keep the volatility of the blended gasoline constant. It would be advantageous to provide a commercially attractive use for the displaced pentanes.

Pentane itself has a relatively low octane, and its use as a refinery fuel is therefore of relatively low value. Pentanes can be used as a feedstock to flexi-crackers to produce ethylene and propylene. However, pentanes tend to give excessive yields of heavier, lower-valued products. Yet another potential use is to dehydrogenate the pentanes to form pentenes, and oligomerize the pentanes to form decenes, which can be hydrogenated to form jet fuel. However, this process is relatively expensive.

It would be desirable to provide a process for producing useful products from pentanes that do not require using a Flexi-cracker, or require using capital intensive equipment. The present invention provides such a process.

SUMMARY OF THE INVENTION

In its broadest aspect, the present invention is directed to an integrated process for producing butanes and hexanes from a feedstock that includes pentanes. The process involves obtaining an appropriate pentane-containing feedstock and subjecting the pentanes to conditions of alkane dehydrogenation to olefins, olefin metathesis, and olefin hydrogenation to alkanes, which collectively are referred to as molecular redistribution. The molecular redistribution reaction provides a product stream that includes $C_{2-4}$ alkanes, predominantly butane, and $C_6+$ alkanes, predominantly hexane, in addition to un-converted pentanes.

The product stream can be distilled to provide a first fraction rich in butanes, a second fraction rich in pentanes and a third fraction containing predominantly $C_6+$ alkanes.

The majority of the ethane and propane in the $C_{2-4}$ fraction can be removed using deethanization and/or depropanization columns, using technology well known to those of skill in the art. N-butane can be isomerized to form isobutane and then used to form a high-octane alkylate. Alternatively, the butane stream can be subjected to a separate molecular redistribution reaction to form ethane and propane, along with additional $C_5+$ products. N-butane can also be dehydrogenated to form butenes, which can be alkylated with iso-butane to form high octane gasoline, or used to form other compounds, such as butanol and butadiene.

The $C_6+$ fraction tends to be highly paraffinic and have low ppb sulfur and can be used, for example, as a solvent or as a feedstock for reforming reactions, for example using the AROMAX™ process or conventional platforming or rheniforming processes, to produce aromatic compounds. Alternatively, the $C_6+$ fraction can be isomerized to improve the octane value and used in gasoline compositions.

When n-pentane is used as a feed, the products tend to be highly linear. An isomerization catalyst can be added to the catalyst bed, which produces intermediate isoalkanes during the molecular redistribution reaction. This is advantageous, since the reaction of n-butane with isopentane produces a mixture of isomeric products, including n-hexane, 2-methylpentane, and 3-methylpentane. The n-pentane can also be isomerized in a separate upstream unit using known dual function catalysts which include a hydrogenation/dehydrogenation component (typically Pd or Pt catalysts) and an acidic component (typically a zeolite catalyst).

If an isomerization catalyst is not added to the catalyst bed, the products of the molecular redistribution reaction can optionally be subjected to catalytic isomerization using the dual function catalysts described above. Useful isomers of hexane include 2-methylpentane, with an octane value of about 73 and 3-methyl pentane, with an octane value of about 74, where normal hexane has an octane value of only about 25.

Depending on the nature of the molecular redistribution chemistry, it may be desirable that the feedstock not include appreciable amounts (i.e., amounts that would adversely affect the catalyst used for molecular redistribution) of hydrogen, alkenes, alkynes, thiols, amines, water, air, oxygenates or cycloparaffins such as cyclohexane and methylcyclopentane which might convert to aromatics in the presence of the catalysts.

Methods for removing sulfur and nitrogen compounds are well known, and generally involve hydrotreating the feedstock. Methods for removing cyclic compounds are also known in the art and generally involve adsorption and separation by molecular sieves. Methods for hydogenating alkenes and alkynes are also well known in the art.

DETAILED DESCRIPTION OF THE INVENTION

In its broadest aspect, the present invention is directed to an integrated process for producing $C_{2-4}$ and $C_6+$ paraffinic product streams from a feedstock that includes pentanes. The process involves obtaining an appropriate pentane feedstock, dehydrogenating the pentanes to form pentenes, methathesizing the resulting pentenes, and rehydrogenating the resulting metathesized olefins to form alkanes. The three steps preferably occur in the same reactor. At least a portion of the initial pentanes is converted to $C_{2-4}$ and $C_6+$ alkanes. Unconverted pentanes can be recycled if desired and converted to additional $C_{2-4}$ and $C_6+$ alkanes.

The process described herein is an integrated process. As used herein the term "integrated process" refers to a process which involves a sequence of steps, some of which may be parallel to other steps in the process, but which are interrelated or somehow dependent upon either earlier or later steps in the total process.

An advantage of the present process is the effectiveness and relatively inexpensive processing costs with which the present process may be used to prepare high quality components for incorporation into gasoline compositions. In particular, an advantage is that feedstocks that are not conventionally recognized as suitable sources for such product streams can be used.

I. PREPARATION OF FEEDSTOCKS FOR THE MOLECULAR REDISTRIBUTION REACTION

Feedstocks for the Molecular Redistribution Reaction

The feedstocks for the molecular redistribution reaction include predominantly pentanes. Primarily, the feedstocks are derived from crude oil and/or natural gas. Any feedstock that includes predominantly pentanes and which does not include an appreciable amount of hydrogen, water, air, olefins, alkynes, cycloparaffins, and heteroatom-containing compounds can be used. Pentane-containing feedstocks can be derived from natural gas, cracked gas feed streams, LPG and refinery waste gas by removing the bulk of the above-listed compounds and $C_{1-4}$ alkanes from the feedstock.

Hydrotreating Chemistry

As noted above, it may be preferable that the feedstocks not include appreciable amounts of heteroatoms or saturated cyclic compounds. If any heteroatoms or saturated cyclic compounds are present in the feedstock, they are preferably removed before the molecular redistribution reaction. Alternatively, if the molecular redistribution occurs at conditions which do not dehydrogenate the cycloparaffins, they can be tolerated.

Certain saturated and partially saturated cyclic hydrocarbons (cycloalkanes which can form aromatics in the presence of the catalysts, such as cyclohexane and methylcyclopentane, aromatic-cycloalkanes, and alkyl derivatives of these species) can form hydrogen during the molecular redistribution reaction. The hydrogen produced from the formation of aromatics can inhibit the reaction, and should therefore be substantially excluded from the feed. The term "substantially excluded," as used herein, means less than about 5 wt. % of the feed, and more preferably less than about 2 wt. % of the feed.

The desired paraffins can be separated from the saturated and partially saturated cyclic hydrocarbons by distillation to separate the C6 cycloparaffins and, if necessary, using molecular sieve adsorbents or other techniques well known in the art to separate C5 cycloparaffins.

Sulfur impurities can be removed using means well known to those of skill in the art, for example extractive Merox, hydrotreating, adsorption, etc. Nitrogen-containing impurities can also be removed using means well known to those of skill in the art. Hydrotreating is the preferred means for removing these and other impurities.

Accordingly, it may be preferred that the feedstocks be hydrotreated before performing the molecular redistribution process described herein. As used herein, the term "hydrotreating" is given its conventional meaning and describes processes that are well known to those skilled in the art. Hydrotreating refers to a catalytic process, usually carried out in the presence of free hydrogen, in which the primary purpose is the desulfurization and/or denitrification of the feedstock. Generally, in hydrotreating operations, cracking of the hydrocarbon molecules, i.e., breaking the larger hydrocarbon molecules into smaller hydrocarbon molecules, is minimized and the unsaturated hydrocarbons are either fully or partially hydrogenated. If the pentanes come from a clean source such as a hydrocracker or isomerization unit, additional hydrotreating may not be needed.

Catalysts used in carrying out hydrotreating operations are well known in the art. See, for example, U.S. Pat. Nos. 4,347,121 and 4,810,357 for general descriptions of hydrotreating, and typical catalysts used in hydrotreating processes.

Suitable catalysts include noble metals from Group VIIIA, such as platinum or palladium on an alumina or siliceous matrix, and unsulfided Group VIIIA and Group VIB metals, such as nickel-molybdenum or nickel-tin on an alumina or siliceous matrix. U.S. Pat. No. 3,852,207 describes a suitable noble metal catalyst and reaction conditions. Other suitable catalysts are described, for example, in U.S. Pat. Nos. 4,157,294 and 3,904,513. Non-noble metals (such as nickel-molybdenum) are usually present in the final catalyst composition as oxides, or possibly as sulfides, when such compounds are readily formed from the particular metal involved. Preferred non-noble metal catalyst compositions contain in excess of about 5 weight percent, preferably about 5 to about 40 weight percent molybdenum and/or tungsten, and at least about 0.5, and generally about 1 to about 15 weight percent of nickel and/or cobalt determined as the corresponding oxides. The noble metal (such as platinum) catalysts include in excess of 0.01 percent metal, preferably between 0.1 and 1.0 percent metal. Combinations of noble metals may also be used, such as mixtures of platinum and palladium.

The hydrogenation components can be incorporated into the overall catalyst composition by any one of numerous procedures. The hydrogenation components can be added to the matrix component by co-mulling, impregnation, or ion exchange and the Group VI components, i.e., molybdenum and tungsten can be combined with the refractory oxide by impregnation, co-mulling or co-precipitation. Although these components can be combined with the catalyst matrix as the sulfides, that may not be preferred, as the sulfur compounds may interfere with some molecular redistribution catalysts.

The matrix component can be of many types including some that have acidic catalytic activity. Ones that have activity include amorphous silica-alumina or may be a zeolitic or non-zeolitic crystalline molecular sieve. Examples of suitable matrix molecular sieves include zeolite Y, zeolite X and the so-called ultra stable zeolite Y and high structural silica:alumina ratio zeolite Y such as that described in U.S. Pat. Nos. 4,401,556, 4,820,402 and 5,059, 567. Small crystal size zeolite Y, such as that described in U.S. Pat. No. 5,073,530, can also be used. Non-zeolitic molecular sieves which can be used include, for example, silicoaluminophosphates (SAPO), ferroaluminophosphate, titanium aluminophosphate, and the various ELAPO molecular sieves described in U.S. Pat. No. 4,913,799 and the references cited therein. Details regarding the preparation of various non-zeolite molecular sieves can be found in U.S. Pat. Nos. 5,114,563 (SAPO); 4,913,799 and the various references cited in U.S. Pat. No. 4,913,799. Mesoporous molecular sieves can also be used, for example the M41S family of materials (*J. Am. Chem. Soc.* 1992, 114, 10834–10843), MCM-41 (U.S. Pat. Nos. 5,246,689, 5,198, 203 and 5,334,368), and MCM-48 (Kresge et al., *Nature* 359 (1992) 710).

Suitable matrix materials may also include synthetic or natural substances as well as inorganic materials such as clay, silica and/or metal oxides such as silica-alumina, silica-magnesia, silica-zirconia, silica-thoria, silica-berylia, silica-titania as well as ternary compositions, such as silica-alumina-thoria, silica-alumina-zirconia, silica-alumina-magnesia, and silica-magnesia zirconia. The latter may be either naturally occurring or in the form of gelatinous precipitates or gels including mixtures of silica and metal oxides. Naturally occurring clays which can be composited with the catalyst include those of the montmorillonite and kaolin families. These clays can be used in the raw state as originally mined or initially subjected to calumniation, acid treatment or chemical modification.

Furthermore, more than one catalyst type may be used in the reactor. The different catalyst types can be separated into layers or mixed. Typical hydrotreating conditions vary over a wide range. In general, the overall LHSV is about 0.25 to 2.0, preferably about 0.5 to 1.0. The hydrogen partial pressure is greater than 200 psia, preferably ranging from about 500 psia to about 2000 psia. Hydrogen recirculation rates are typically greater than 50 SCF/Bbl, and are preferably between 1000 and 5000 SCF/Bbl. Temperatures range from about 300° F. to about 750° F., preferably ranging from 450° F. to 600° F.

The contents of each of the patents and publications referred to above are hereby incorporated by reference in its entirety.

II. MOLECULAR REDISTRIBUTION CHEMISTRY

As used herein, "molecular redistribution" is a process in which a single paraffin, a mixture of isomeric paraffins, and/or a mixture of paraffins and/or isoparaffins with a narrow molecular weight range (i.e., a mixture including mostly pentanes but which may also include up to 25% or more of butanes and hexanes) which is converted into a mixture that includes lighter and heavier paraffins than those in the starting paraffin or paraffinic mixture. The term "disproportionation" is also used herein to describe these processes.

Molecular redistribution typically uses a combination of conventional hydrogenation/dehydrogenation catalysts, such as $Pt/Al_2O_3$, and conventional olefin metathesis catalysts, such as $WO_3/SiO_2$ (or inexpensive variations thereof). The chemistry does not require using hydrogen gas, and therefore does not require relatively expensive recycle gas compressors. The chemistry is typically performed at mild pressures (100–5000 psig). The chemistry is typically thermoneutral and, therefore, there is no need for expensive reactor quench systems or interstage reheaters to control the temperature.

Depending on the nature of the catalysts, molecular redistribution may be sensitive to impurities in the feedstock, such as nitrogen and sulfur-containing compounds and moisture, and these may need to be removed prior to the reaction. The presence of excess olefins and hydrogen in the molecular redistribution zone are also known to effect the equilibrium of the molecular distribution reaction and may possibly deactivate the catalyst. Since the composition of the fractions may vary, some routine experimentation will be necessary to identify the contaminants that are present and identify the optimal processing scheme and catalyst to use in carrying out the invention.

Molecular redistribution, as described herein, generally involves two distinct chemical reactions. First, the paraffins are converted into olefins on the hydrogenation/dehydrogenation catalyst in a process known as dehydrogenation or unsaturation. The resulting olefins are molecularly redistributed, or disproportionated, into lighter and heavier olefins by a process known as olefin metathesis upon contacting the metathesis catalyst. The metathesized olefins are then converted into paraffins in a process known as hydrogenation or saturation upon contact with the hydrogenation/dehydrogenation catalyst. The $C_{5-}$ containing feedstock is molecularly redistributed, or disproportionated, to produce a product stream that includes $C_{4-}$ and $C_{6}+$ hydrocarbons.

Various catalysts are known to catalyze the molecular redistribution reaction. The catalyst mass used to carry out the present invention must have both hydrogenation/dehydrogenation activity and olefin metathesis activity. The dehydrogenation activity is believed to be necessary to convert the alkanes to olefins, which are believed to be the actual species that undergo olefin metathesis. Following olefin metathesis, the olefin is converted back into an alkane. It is theorized that the hydrogenation/dehydrogenation activity of the catalyst also contributes to rehydrogenation of the olefin to an alkane. While it is not intended that the present invention be limited to any particular mechanism, it may be helpful in explaining the choice of catalysts to further discuss the sequence of chemical reactions which are believed to be responsible for molecular redistribution of the alkanes. As an example, the general sequence of reactions for pentane is believed to be:

$$C_5H_{12} \leftrightarrows C_5H_{10} + H_2$$

$$2C_5H_{10} \leftrightarrows C_4H_{8+} C_6H_{12}$$

$$C_4H_{8+} C_6H_{12} + 2H_2 \leftrightarrows C_4H_{10+} C_6H_{14}$$

The molecular redistribution reaction uses different catalysts having separate hydrogenation/dehydrogenation and olefin metathesis activity, one to dehydrogenate the paraffinic feedstock and hydrogenate the metathesized olefins, and the other to methathesize the (dehydrogenated) feedstock. The hydrogenation/dehydrogenation catalyst will typically include a Group VIII metal from the Periodic Table of the Elements, which includes iron, cobalt, nickel, palladium, platinum, rhodium, ruthenium, osmium, and iridium. When used in this disclosure, the Periodic Table of the Elements referred to is the version published by the Chemical Abstracts Service in the Handbook of Chemistry and Physics, 72nd Edition 1991–1992).

Platinum and palladium or the compounds thereof are preferred for inclusion in the hydrogenation/dehydrogenation component, with platinum or a compound thereof being especially preferred. As noted previously, when referring to a particular metal in this disclosure as being useful in the present invention, the metal may be present as elemental metal or as a compound of the metal. As discussed above, reference to a particular metal in this disclosure is not intended to limit the invention to any particular form of the metal unless the specific name of the compound is given, as in the examples in which specific compounds are named as being used in the preparations.

Usually, the olefin metathesis catalyst will include one or more of a metal or the compound of a metal from Group VIB or Group VIIB of the Periodic Table of the Elements, which include chromium, manganese, molybdenum, rhenium and tungsten. Molybdenum, rhenium, tungsten, and compounds including these metals are preferred for including in the molecular redistribution catalyst. Tungsten and compounds including tungsten are particularly preferred. The metals described above may be present as elemental metals or as compounds including the metals, such as, for example, metal oxides. The metals may be present on the catalyst component either alone or in combination with other metals.

In most cases, the metals in the catalyst mass will be supported on a refractory material. Refractory materials suitable for use as a support for the metals include conventional refractory materials used in the manufacture of catalysts for use in the refining industry. Such materials include, but are not necessarily limited to, alumina, zirconia, silica, boria, magnesia, titania and other refractory oxide material or mixtures of two or more of any of the materials. The support may be a naturally occurring material such as clay, or synthetic materials such as silica-alumina and borosilicates. Molecular sieves such as zeolites also have been used as supports for the metals used in carrying out the dual functions of the catalyst mass. See, for example, U.S. Pat. No. 3,668,268. Mesoporous materials such as MCM-41 and MCM-48, such as described in Kresge, C. T., et al., *Nature* (Vol. 359) pp. 710–712, 1992, may also be used as a refractory support. Other known refractory supports such as carbon may also serve as a support for the active form of the metals in certain embodiments. The support is preferably non-acidic, i.e., having few or no free acid sites on the molecule. Free acid sites on the support may be neutralized by means of alkali metal salts, such as those of lithium. Alumina, particularly alumina on which the acid sites have been neutralized by an alkali salt such as lithium nitrate, is usually preferred as a support for the hydrogenation/dehydrogenation component, and silica is usually preferred as the support for the metathesis component.

The amount of active metal present on the support may vary, but it must be at least a catalytically active amount, i.e., a sufficient amount to catalyze the desired reaction. In the case of the hydrogenation/dehydrogenation component, the active metal content will usually fall within the range from about 0.01 weight percent to about 50 weight percent on an elemental basis, with the range of from about 0.1 weight percent to about 20 weight percent being preferred. For the metathesis component, the active metals content will usually fall within the range of from about 0.01 weight percent to about 50 weight percent on an elemental basis, with the range of from about 0.1 weight percent to about 25 weight percent being preferred.

A typical catalyst for use in the processes described herein includes a platinum component and a tungsten component as described in U.S. Pat. No. 3,856,876, the entire disclosure of which is herein incorporated by reference. In one embodiment of the present invention, the catalyst includes a mixture of platinum-on-alumina and tungsten-on-silica, wherein the volumetric ratio of the platinum component to the tungsten component is greater than 1:50 and less than 50:1. Preferably the volumetric ratio of the platinum component to the tungsten component in this particular embodiment is between 1:10 and 10:1. The percent of surface of the metals should be maximized with at least 10% of the surface metal atoms exposed to the reactant.

In one embodiment, both the hydrogenation/dehydrogenation component and the olefin metathesis component are present within the catalyst mass on the same support particle as, for example, a catalyst in which the hydrogenation/dehydrogenation component is dispersed on an unsupported olefin metathesis component such as tungsten oxide. However, in an alternative embodiment, the catalyst components are separated on different particles.

In a reactor having a layered fixed catalyst bed, the two components may, in such an embodiment, be separated in different layers within the bed. However, separate reactors may be used for carrying out the dehydrogenation and olefin metathesis steps. In processing schemes where the dehydrogenation of the alkanes to olefins occurs separately from the olefin metathesis reaction, it may be necessary to include an additional hydrogenation step in the process, since the rehydrogenation of the olefins must take place after the olefin metathesis step.

The process conditions selected for carrying out the present invention will depend upon the molecular redistribution catalysts used. In general, the temperature in the reaction zone will be within the range of from about 400° F. (200° C.) to about 1000° F. (540° C.) with temperatures in the range of from about 500° F. (260° C.) to about 850° F. (455° C.) usually being preferred. In general, the conversion of the alkanes increases with an increase in pressure. Therefore, the selection of the optimal pressure for carrying out the process will usually be at the highest practical pressure under the circumstances. Accordingly, the pressure in the reaction zone should be maintained above 100 psig, and preferably the pressure should be maintained above 500 psig. The maximum practical pressure for the practice of the invention is about 5000 psig. More typically, the practical operating pressure will below about 3000 psig. The feedstock to the molecular redistribution reactor should contain a minimum of olefins, and preferably should contain no added hydrogen.

Platinum/tungsten catalysts are particularly preferred for carrying out the present invention because the molecular redistribution reaction will proceed under relatively mild conditions. When using the platinum/tungsten catalysts, the temperature should be maintained within the range of from about 400° F. (200° C.) to about 1000° F. (540° C.), with temperatures above about 500° F. (260° C.) and below about 800° F. being particularly desirable.

The olefin metathesis reaction described above is reversible, which means that the reaction proceeds to an equilibrium limit. Therefore, assuming a pure n-pentane feed, equilibrium will drive the reaction to produce a paraffinic stream having an average molecular weight equal to that of pentane, but with a distribution around $C_5$, with lighter products being somewhat favored. Accordingly, the bulk of the reaction products will be butane, hexane and unconverted pentane, with some propane and hexane, and relatively minor amounts of ethane and $C_7+$ products. These equilibrium limits apply to both normal and iso-paraffins.

It is desirable to reduce the concentration of the desired products in the molecular redistribution zone to as low a concentration as possible to favor the reactions in the desired direction. As such, some routine experimentation may be necessary to find the optimal conditions for conducting the process.

In one embodiment, at least a portion of the pentane feed has been isomerized to form iso-pentane. The reaction products resulting from the reaction of n-pentane are n-hexane and n-butane. When a mixture of n-pentane and iso-pentane are used as a feedstock for the molecular redistribution reaction, a mixture of products is formed, including n-hexane, 2-methylpentane and 3-methylpentane. Because the metathesis reaction reaches an equilibrium product distribution, some of these paraffins also participate in molecular redistribution reactions, and can provide isoalkanes in the $C_7+$ range. Iso-pentane by itself tends to react more slowly than n-pentane. Accordingly, it can be preferred to use mixtures of iso-pentane and n-pentane to maintain a relatively high rate of reaction.

In the event the catalyst deactivates with the time-on-stream, specific processes that are well known to those skilled in art are available for the regeneration of the catalysts.

Any number of reactors can be used, such as fixed bed, fluidized bed, ebulated bed, and the like. An example of a suitable reactor is a catalytic distillation reactor which would permit continuous recovery of the desired lower molecular weight product.

Fractional Distillation

The resulting product stream can be distilled to provide a $C_{2-4}$ paraffin fraction, a fraction rich in pentanes, and a $C_6+$ paraffin fraction. An ethane-rich or ethane/propane-rich fraction can also be isolated via known methodology, for example using a deethanizer or depropanizer column. The ethane-rich or ethane/propane-rich fraction can be sent to an ethane cracker or an ethane/propane cracker, depending on the quality of the fraction. The butane fraction can be alkylated using known methodology, as described below. The fraction rich in pentanes can be recycled through the molecular redistribution stage to form additional $C_{2-4}$ and $C_6+$ paraffins. The process can be repeated in a series of recycles to convert virtually all of the pentanes to $C_{2-4}$ and $C_6+$ paraffins.

Formation of Ethylene and Propylene

The ethane and/or propane isolated from the product stream can be converted to ethylene and minor amounts of propylene using ethane or ethane/propane crackers. Flexicrackers could be used, although this would not be cost effective. While other methods for converting alkanes to ethylene and/or propylene are known, these are not preferred. Suitable EP crackers and conditions for their use are well known to those of skill in the art, and are described in detail below. The products of the EP cracker include ethylene, propylene, and a small amount of heavier material, each of which can be isolated using known methodology.

Ethylene and/or propylene are obtained by steam cracking of ethane and/or propane. Conditions for obtaining ethylene and propylene are well known to those of skill in the art, and are described, for example, in SRI International-Process Economics Program, Ethylene, Report 29 E, October 1991, the contents of which are hereby incorporated by reference. Typically, ethane or ethane/propane crackers are used, depending on the feed. With ethane cracking, the amount of propylene produced is relatively small, with a ratio of 48:1 ethylene to propylene. With ethane/propane cracking, the ratio is 8.5:1. However, considering the scale at which ethylene can be produced, the amount of propylene produced may still be commercially significant.

Steam cracking involves subjecting ethane and/or propane to hydrocarbon cracking or pyrolysis in the presence of steam in tubular reactors in direct-fired heaters (furnaces). Steam does not enter the pyrolysis reactions directly, but it improves product selectivity and reduces coking in the pyrolysis tubes and downstream quench coolers.

Typically, a number of furnaces operating in parallel are used. The exact number of furnaces depends on the capacity of the furnaces and the desired output. Each furnace includes a convection zone where waste heat is recovered, and a radiant zone where pyrolysis occurs.

A steam-containing ethane or ethane/propane feedstock is preheated in the convection zone to about 538° C. to 649° C. (1000° F. to 1200° F.) before it crosses over to the radiant zone. Pyrolysis takes place at a temperature of between 788° C. and 899° C. (1450° F. to 1650° F.), with residence times in the radiant zone of between 0.05 to 0.6 seconds, depending on the feedstock and severity of cracking required. The higher the temperature and shorter the residence time, the higher the severity of the cracking.

The cracked gas is immediately cooled (quenched) to between 338° C. and 510° C. (640° F. to 959° F.), allowing the cracking to stop and allowing the heat to be recovered, for example by generating high pressure steam in heat exchangers. The resulting cooled stream is then flowed toward a direct water quench tower, further cooling the gas with recirculating cold water at a temperature of between 35° C. and 40° C. (95° F. to 105° F.).

The cooled gas is compressed, for example centrifugally compressed, to a pressure of between about 415 and 550 psia in a plurality of stages, typically between four and five stages. Between these stages, water and high molecular weight products are separated. The gaseous product is then washed with a caustic solution or an alkylamine solution followed by a caustic solution to remove any acidic gases, such as carbon dioxide. The gas is then dried with a desiccant, optionally including a glycol. The dried gas is then cooled, for example with propylene and ethylene refrigerants, to cryogenic temperatures. The product is then separated downstream by fractionation. The product separation is typically performed in one of three ways: front-end demethanization, front-end depropanization, or front-end deethanization.

Alkylation Reactions Using the $C_4$ Fraction

The isobutane formed during the metathesis reaction and optionally after an additional isomerization step, along with other isoalkanes, can be used to prepare components for gasoline compositions known as alkylates. Alkylates are highly branched and often have high-octane values. Alkylates are typically formed using an acid catalyst, an isoalkane such as isobutane, and a $C_{3-6}$ alkene. Suitable acid catalysts and reaction conditions are described, for example, in U.S. Pat. No. 5,968,868 to Tajima et al. and PCT WO 94/10106, the contents of which are hereby incorporated by reference.

The alkylation reaction is often accompanied by various side reactions, including isomerization, polymerization, cracking and disproportionation. It is preferable that these side reactions are minimized, and various catalyst systems have been developed to minimize these reactions.

One such catalyst system is formed by reacting a zirconium halide with a magnesium halide, as described in U.S. Pat. No. 5,968,868 to Tajima.

Examples of suitable alkene for performing the alkylation reaction include propylene, 1-butene, trans-2-butene, cis-2-butene, isobutylene, 1-pentene, 2-pentene, 2-methylbut-1-ene, 2-methylbut-2-ene, 1-hexene, 2-hexene, 2-methylpent-1-ene, 4-methylpent-1-ene and mixtures thereof. 1-butene, trans-2-butene, cis-2-butene and isobutylene are preferred.

Isobutane from the metathesis reaction described herein is a preferred isoalkane. However, the reaction can also include other $C_{4-6}$ isoalkanes, such as isopentane, isohexane and mixtures thereof.

The purity of the isoalkanes and alkene is preferably at least 50%, more preferably at least 60%. The reactants may include other hydrocarbons or hydrogen. The mole ratio of alkene:isoalkane in the alkylation reaction is typically between about 1:1–1:1000, preferably 1:2–1:500, more preferably 1:2–1:50. The reaction is usually run at a temperature between about 15 and 200° C., preferably between about 20 and 150° C., more preferably between about 20 and 125° C., and still more preferably between about 50 and 100° C. The pressure is typically between about atmospheric pressure and 5 MPa, preferably between about 0.3 and 2 MPa.

The reaction can occur in either liquid phase or gas phase, but preferably in liquid phase, and in either batch or continuous mode of operation. In the batch operation, the weight ratio of reactants (alkene and isoalkane) to catalyst is between about 1/1 to 200/1, preferably between 5/1 and 100/1. The reaction times run between about 5 minutes and 5 hours.

When run in continuous mode, the reactants are fed through a catalyst at a liquid space velocity (LSV) of between about 0.01 and 30 $h^{-1}$, preferably between about 0.1 and 20 $h^{-1}$.

In addition to the alkene and isoalkane reactants, the reaction mixture can include water or a $C_{1-4}$ alcohol. These reactants can increase the alkene conversion and provide higher yields of branched isoalkanes.

The reaction products (higher molecular weight isoalkanes) can be separated from the reactants, for example via distillation. Unreacted starting materials can be recycled, and the product separated from by-products, which tend to be high molecular weight compounds, by distillation.

The products of the reaction are highly branched isoalkanes, typically $C_{7-9}$ isoalkanes. For example, the reaction of isobutane with a mixture of butenes produces trimethyl pentane, among other products. Trimethyl pentane can be used as a component of a high-octane gasoline composition.

Isomerization of the Resulting $C_6+$ Paraffins

The resulting $C_6+$ paraffins can be used to form a variety of products. For example, the $C_6+$ product stream can also be used as. Alternatively, The $C_6+$ product stream can be isomerized, particularly for use in gasoline compositions. When the $C_6+$ fraction resulting from the molecular redistribution stage is isomerized, the product has methyl branches, thus improving its octane value. This can be particularly preferred when preparing fuel compositions where a high octane is desired.

Isomerization processes are typically carried out at a temperature between 200° F. and 700° F., preferably 300° F. to 550° F., with a liquid hourly space velocity between 0.1 and 2, preferably between 0.25 and 0.50. Hydrogen is employed such that the mole ratio of hydrogen to hydrocarbon is between 1:1 and 5:1. Catalysts useful for isomerization processes are generally bifunctional catalysts that include a hydrogenation component (preferably selected from the Group VIII metals of the Periodic Table of the Elements, and more preferably selected from the group consisting of nickel, platinum, palladium and mixtures thereof) and an acid component. Examples of an acid component useful in the preferred isomerization catalyst include a crystalline zeolite, a halogenated alumina component, or a silica-alumina component. Such paraffin isomerization catalysts are well known in the art.

Other Processes for Altering the $C_6+$ Product Stream

In a preferred embodiment, at least a portion of the $C_6+$ product stream is reformed, for example using reforming conditions, to form aromatic products. Reforming is a complex process and involves a number of competing processes or reaction sequences. These include dehydrogenation of cyclohexanes to aromatics, dehydroisomerization of alkylcyclopentanes to aromatics, and dehydrocyclization of acyclic hydrocarbons to aromatic. The hydrocracking of paraffins to light products boiling outside the gasoline range and the dealkylation of alkylbenzenes are undesirable reactions in reforming processes. As the $C_6+$ product stream includes predominantly acyclic paraffins, the major reforming reaction is dehydrocyclization.

Conditions suitable for reforming $C_6+$ product streams are well known in the art. Representative reforming processes include the AROMAX™ process and platforming or rheniforming processes. The AROMAX™ process is well known to those of skill in the art, and is described, for example, in *Petroleum & Petrochemical International*, Volume 12, No. 12, pages 65 to 68 (1972). Rheniforming processes are also well known to those of skill in the art, and are described, for example, in U.S. Pat. No. 3,415,737, the contents of which are hereby incorporated by reference. The conventional reforming processes all tend to use catalysts that contain Pt and alumina, and frequently contain other elements such as rhenium, iridium, chlorine, fluorine and combinations thereof. Conventional platforming and rheniforming conditions may be preferred for $C_7+$ feedstocks, as they provide high yields and the catalysts are relatively stable. The AROMAX™ process is preferred for $C_{6-7}$ feedstocks, and tends to give relatively high product yields.

These processes, their commercial startup conditions and their useful range of process operating conditions are all well known to those skilled in the art. These processes can be carried out in a single reactor or in a series of reactors.

Feedstock

The feedstock for the reforming reaction is a $C_6+$ paraffinic fraction, preferably a normal $C_{6-8}$ paraffinic fraction and/or a mono-alkyl $C_{6-8}$ isoparaffinic fraction, with a minimum of dialkyl-isoparaffins, for example dimethyl isoparaffins. More preferably, the stream includes predominantly $C_6$ and $C_7$ hydrocarbons. Using the AROMAX™ process, yields of aromatic compounds are nearly 90% when this stream is used. Isoparaffins such as 2,2-dimethylbutane or 2,3-dimethylbutane are preferably not used, as they do not reform well in AROMAX™ or other reforming conditions. The $C_6+$ product from the molecular redistribution of n-pentane and iso-pentane is an example of a suitable feedstock.

As with the molecular redistribution reaction described above, the feed should also be substantially free of sulfur, nitrogen, metals and other known poisons. Methods for removing such poisons from the feed have been discussed above. In a preferred embodiment, the $C_6+$ hydrocarbons contacting the catalyst are substantially dry and free of sulfur, i.e., sulfur levels are preferably maintained below about 50 ppb, preferably below about 25 ppb and more preferably below about 10 ppb. Sulfur removal systems are well known in the ultra-low sulfur reforming art. If the product of the molecular redistribution reaction in the $C_6+$ range is combined with other feedstocks in that range, sulfur and other impurities need to be removed.

Conversion Processes

The catalytic reforming process is a low sulfur reforming process, preferably using a bound, halided Pt L-zeolite catalyst. Catalytic reforming is well known. For example, it is described in the book *Catalytic Reforming* by D. M. Little, PennWell Books (1985), which is incorporated herein by reference in its entirety.

The reaction is preferably conducted at a temperature between 400 and 1100° F., more preferably between 800 and 1050° F. In the temperature range of from 400 to 600° C., the reforming reaction can occur with acceptable speed and selectivity. When using traditional reforming catalysts, if the operating temperature is below 400° C., the reaction speed is insufficient and consequently the yield is too low for industrial purposes. When the operating temperature is above 600° C., interfering secondary reactions such as hydrocracking and coking may occur, reducing the catalyst life and yield. These secondary reactions are minimized using the bound, halided, zeolite catalysts described herein. They can also be minimized by incorporating an alkali metal, such as potassium, or an alkaline earth metal, such as barium, strontium or calcium, preferably barium, into the catalysts. The metals can be incorporated, for example via ion exchange, as described, for example, in U.S. Pat. No. 4,447,316 to Buss et al., the contents of which are hereby incorporated by reference.

The pressure is preferably between 0 and 400 psig, more preferably between 15 and 150 psig. The recycle hydrogen rate is sufficient to yield a hydrogen to hydrocarbon mole ratio for the feed to the reforming reaction zone between 0.1 and 20, more preferably between 0.5 and 10 and most preferably between 2 and 6. The liquid hourly space velocity (LHSV) for the hydrocarbon feed over the reforming catalyst is between 0.1 and 10 hr$^{-1}$, more preferably between 0.5 and 5 hr$^{-1}$. Reforming produces hydrogen. Thus, additional hydrogen is not needed except when the catalyst is reduced upon startup, and when the feed is first introduced. Once reforming is underway, part of the hydrogen that is produced is preferably recycled over the catalyst.

In one embodiment, aromatics are prepared by first preparing a halided zeolite catalyst, bringing the catalyst on stream using commercial startup conditions, and contacting the catalyst with the $C_6+$ paraffinic fraction at catalytic reforming conditions to produce aromatics. The catalyst is preferably prepared by washing a calcined, bound zeolite catalyst base with an aqueous liquid, and adding at least one halogen-containing compound and a Group VIII metal compound to the washed base.

In a preferred embodiment, the $C_6+$ fraction is converted to an aromatic product stream by catalytic conversion of the $C_6+$ feed under conversion conditions that include a commercial-type catalyst startup (at a low gas flow rate and a slow heat-up rate). The process preferably uses a bound and washed halided zeolite catalyst containing a Group VIII metal, where the halided catalyst has a cycle length of >1200 hr following startup. The halided catalyst is preferably prepared by a process that involves washing a bound zeolite catalyst base or catalyst before halide addition and before reduction.

The feed can be contacted with the catalyst in a fixed bed system, a moving bed system, a fluidized system, or a batch system. Either a fixed bed system or a moving bed system is preferred. In a fixed bed system, the preheated feed is passed into at least one reactor that contains a fixed bed of the catalyst. The flow of the feed can be upward, downward or radial. The effluent from the catalytic reforming reaction zone can be separated into the desired streams or fractions.

Catalyst Selection

The reforming catalysts used in the AROMAX™ process or similar reforming processes are preferably bound and include a Group VIII metal, preferably Pt. The catalysts are also preferably halided, and, more preferably, are (water) washed, bound, halided catalysts. The term "catalyst" includes both the final catalyst as well as precursors of the final catalyst. Precursors of the final catalyst include, for example, the calcined form of the catalyst containing the catalytic metal and also the catalyst prior to activation by reduction. As used herein, the term "bound" is intended to describe a zeolite, binder combination that is formed into aggregates such as pellets, pills, extrudates and the like. The term "catalyst base," as used herein, refers to a bound zeolite.

Zeolites

Catalysts useful in the reforming reaction typically include one or more zeolites or non-zeolitic molecular sieves and at least one catalytic metal, preferably a Group VIII metal. The catalysts typically also include a binder such as a refractory oxide, e.g., silica, alumina, chlorided alumina or silica-alumina. Preferred zeolites and/or molecular sieves are selected from those of the large and intermediate pore variety. The AROMAX™ process traditionally uses PtBaK/L-zeolite as a catalyst. Traditional platforming and rheniforming processes use $Pt/Al_2O_3$ or $PtRe/Al_2O_3$ as the catalyst. These and other catalysts and suitable reforming conditions are described, for example, in U.S. Pat. Nos. 3,546,102; 3,574,092; 3,679,575; 4,018,711; 4,104,320; 4,347,394; 4,370,224, 4,417,083; 4,434,311; 4,447,316 and 5,559,068.

Catalysts including platinum on chlorinated-alumina supports and Pt-X on alumina or chlorinated-alumina supports, where X is rhenium, iridium or tin have been used in catalytic reforming reactions. U.S. Pat. No. 4,370,224 discloses a multi-metallic reforming catalyst that includes platinum, iridium, copper, selenium and halogen, composited with an inorganic oxide support or carrier, preferably alumina. Zeolite-containing reforming catalysts, for example the zeolite mordenite, ZSM-type zeolites, zeolite L, Faujasites X and Y, and the zeolite omega, have been used.

Representative of the large pore zeolites are ZSM-3, ZSM-4, ZSM-10, ZSM-12, ZSM-20, zeolite beta, zeolite omega, zeolite L, zeolite X, zeolite Y, REY, USY, RE-USY, mordenite, LZ-210, LZ-210-M, LZ-210-T, LZ-210-A, SSZ-24, SSZ-26, SSZ-31, SSZ-33 (where SSZ-26 and SSZ-33 include both large and intermediate pores), SSZ-35, SSZ-37 (believed to be an intermediate pore zeolite with large pore side pockets connecting the intermediate pore channels), SSZ-41, SSZ-42, SSZ-44 and MCM-58. ZSM-3 is described in U.S. Pat. No. 3,415,736. ZSM-4 is described in UK Application No. 1,117,568. ZSM-10 is described in U.S. Pat. No. 3,692,470. ZSM-12 is described in U.S. Pat. No. 3,832,449; ZSM-20 is described in U.S. Pat. No. 3,972,983. Zeolite beta is described in U.S. Pat. No. Re. 28,341 (of original U.S. Pat. No. 3,308,069). Zeolite omega is described in U.S. Pat. No. 4,241,036. Zeolite L is described in U.S. Pat. No. 3,216,789. Zeolite X is described in U.S. Pat. No. 2,882,244. Zeolite Y is described in U.S. Pat. No. 3,130,007. LZ-210, LZ-210M, LZ-210-T, LZ-210-A and mixtures thereof are described in U.S. Pat. No. 4,534,853. SSZ-24 is described in U.S. Pat. No. 4,834,977. SSZ-26 is described in U.S. Pat. No. 4,910,006. SSZ-31 is described in U.S. Pat. No. 5,106,801. SSZ-33 is described in U.S. Pat. No. 4,963,337. SSZ-35 is described in U.S. Pat. No. 5,316,753. SSZ-37 is described in U.S. Pat. No. 5,254,514. SSZ-41 is described in U.S. Pat. No. 5,591,421. SSZ-44 is described in U.S. Pat. No. 5,580,540. MCM-58 is described in U.S. Pat. No. 5,437,855. The entire contents of all these patents and patent applications are incorporated herein by reference.

Preferably, the catalyst is an L-zeolite or a zeolite having an L-zeolite-type channel structure and size, such as ECR-2, which is described in U.S. Pat. No. 4,552,731, and ECR-31, which is described in U.S. Pat. No. 5,624,657 (Vaughan). Preferably the catalyst is a monofunctional, non-acidic K L-zeolite. Acidity in the L-zeolite generally leads to poor performance in catalytic reforming. Examples of useful L-zeolites include those described in U.S. Pat. Nos. 3,216,789 (Breck), U.S. Pat. No. 4,552,731 (Vaughan), U.S. Pat. No. 4,544,539 (Wortel), U.S. Pat. No. 5,491,119 (Verduijn) and U.S. Pat. No. 4,530,824 (assigned to Tosoh Ltd.). The entire contents of all these patents are incorporated herein by reference. One useful non-acidic L-zeolite is manufactured by Union Oil Product (JOP), Mobile, Ala. A preferred non-acidic L-zeolite is manufactured by Tosoh Ltd., Japan, and sold under the name HSZ-500KOA. For these non-acidic zeolites, potassium is a preferred cation; a preferred catalyst comprises K L-zeolite. Preferred catalysts are monofunctional. They do not have the acid function of conventional reforming catalysts. In contrast, conventional reforming catalysts are bifunctional, with an acid and a metal function, for example $PtRe/Al_2O_3$. Examples of monofunctional catalysts include platinum on L-zeolite, wherein the L-zeolite has been exchanged with an alkali metal, as disclosed in U.S. Pat. No. 4,104,320 to Bernard et al.; platinum on L-zeolite, wherein the L-zeolite has been exchanged with an alkaline earth metal, as disclosed in U.S. Pat. No. 4,634,518 to Buss and Hughes; and platinum on L-zeolite as disclosed in U.S. Pat. No. 4,456,527 to Buss, Field and Robinson. The entire contents of all these patents are incorporated herein by reference.

The term "non-acidic" is understood by those skilled in this area of art, particularly by the contrast between monofunctional (non-acidic) reforming catalysts and bifunctional (acidic) reforming catalysts. One method of achieving non-acidity is by replacing protons with alkali and/or alkaline earth metals in the zeolite. This is preferably achieved, along with other catalyst enhancements, by an ion exchange process on the synthesized zeolite.

The composition of type L zeolite expressed in terms of mole ratios of oxides, may be represented by the following formula:

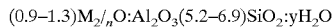

$(0.9-1.3)M_2/_nO:Al_2O_3(5.2-6.9)SiO_2:yH_2O$

In the above formula M represents a cation, n represents the valence of M, and y may be any value from 0 to about 9. Zeolite L, its X-ray diffraction pattern, its properties, and method for its preparation are described in detail in, for example, U.S. Pat. No. 3,216,789, the contents of which are hereby incorporated by reference. The actual formula may vary without changing the crystalline structure. For example, the mole ratio of silicon to aluminum (Si/Al) may vary from 1.0 to 3.5.

As discussed above, one preferred embodiment of the invention uses monofunctional Pt L-zeolite catalysts that have been treated with halogen-containing compounds. This type of halogen treatment is known. For example, U.S. Pat. No. 5,091,351 to Murakawa et al. discloses preparing a Pt L-zeolite catalyst, and then treating it with a halogen-containing compound. Other related patents that disclose halided L-zeolite catalysts include EP 498,182A or U.S. Pat. No. 5,354,933, which discloses co-impregnation of an L-zeolite with $NH_4Cl$ and $NH_4F$; U.S. Pat. Nos. 4,681,865, 4,761,512 and 5,073,652 to Katsuno et al. These patents are all incorporated herein by reference. One preferred hiz-cat for catalytic reforming comprises halided platinum K L-zeolite catalyst, especially one containing both chloride and fluoride.

Examples of useful intermediate pore size zeolites include ZSM-5, ZSM-11, ZSM-22, ZSM-23, ZSM-35; ZSM-48, ZSM-57, SUZ-4, SSZ-23; SSZ-25; and SSZ-32. ZSM-5 is described in U.S. Pat. No. Re. 29,948 (of original U.S. Pat. No. 3,702,886). ZSM-11 is described in U.S. Pat. No. 3,709,979. ZSM-22 is described in U.S. Pat. No. 4,556,477. ZSM-23 is described in U.S. Pat. No. 4,076,842. ZSM-35 is described in U.S. Pat. No. 4,016,245. ZSM-48 is described in U.S. Pat. No. 4,585,747. SSZ4 is described in EP Application No. 353,915. SSZ-23 is described in U.S. Pat. No. 4,859,422. SSZ-25 is described in U.S. Pat. Nos. 4,827,667 and 5,202,014. SSZ-28 is described in U.S. Pat. No. 5,200,377. SSZ-32 is described in U.S. Pat. No. 5,053,373. SSZ-36 is described in U.S. Ser. No. 60/034,252. The entire contents of all these patents and patent applications are incorporated herein by reference.

In addition to silicon, the useful zeolites herein can contain one or more framework elements other than or in addition to aluminum, e.g., the borosilicate zeolites. Also, the zeolites can be modified to alter their as-synthesized framework silica to alumina ratio.

Suitable catalysts can also include non-zeolitic molecular sieves with intermediate or large size pores. Non-zeolitic molecular sieves are microporous, crystalline compositions that are formed from $[AlO_2]$ and $[PO_2]$ tetrahedra and have electrovalently neutral frameworks. See U.S. Pat. No. 4,861,743. Also included among the useful molecular sieves are materials of similar structure or behavior, e.g., crystalline metallophosphates such as those described in U.S. Pat. No. 4,440,871. Non-zeolitic molecular sieves include aluminophosphates ($AlPO_4$) as described for example in U.S. Pat. No. 4,310,440, metalloaluminophosphates, as described in U.S. Pat. Nos. 4,500,651; 4,567,029; 4,544,143; and 4,686,093, nonmetal substituted aluminophosphates as described in U.S. Pat. No. 4,973,785, and microporous, crystalline materials of similar structure or behavior, e.g., crystalline metallophosphates such as those described in U.S. Pat. No. 4,440,871.

Useful catalysts also include intermediate pore silicoaluminophosphates (SAPO's) as the non-zeolitic molecular sieve component. Intermediate pore SAPO's include SAPO-31, SAPO-41 and SM-3. U.S. Pat. No. 4,440,871 describes SAPO's generally and SAPO-11, SAPO-31, and SAPO-41 specifically. The preparation of SM-3 and its unique characteristics are described in U.S. Pat. No. 5,158,665. All these patents are incorporated herein by reference.

Binders

The zeolites and/or molecular sieves are bound. They are preferably composited with matrix materials resistant to the temperatures and other conditions employed in hydrocarbon conversion processes. Such matrix materials can include active and inactive materials. Frequently binders, such as naturally occurring clays and inorganic oxides, are added to improve the crush strength of the catalyst. The selection of binders and binding conditions depends on the zeolite and its intended use.

Suitable binder materials include synthetic or naturally occurring zeolites, alumina, clays such as montmorillonite and kaolin, and the refractory oxides of metals of Groups IVA and IVB of the Periodic Table of the Elements. Particularly useful are the oxides of silicon, titanium zirconium and aluminum, with silica being preferred, especially low acidity silica. Combinations of such oxides with other oxides are also useful, for example, silica-alumina, silica-magnesia, silica-zirconia, silica-thoria, silica-beryllia, silica-titania, titania-zirconia, silica-alumina-thoria, silica-alumina-zirconia, silica-alumina-magnesia and silica-magnesia-zirconia. These oxides can be crystalline or amorphous, or can be in the form of gelatinous precipitates, colloids, sols, or gels. Silica in the form of a silica sol is a preferred binder. A preferred silica sol has about 30 wt % silica and contains small particles (7–9 nm in diameter), which result in catalysts with good attrition resistance and excellent crush strengths.

Extrusion aids and viscosity modifiers are generally used in addition to the binders for forming pellets or extrudates from zeolites and/or molecular sieves. These additives are typically organic compounds such as cellulose based materials, for example, Methocel® sold by Dow Chemical Co., ethylene glycol, and stearic acid. Many such compounds are known in the art. These additives should not leave a detrimental residue, i.e., one with undesirable reactivity or one that can block pores, after calcination. Preferably, the residues do not add significant amounts of alkali or alkaline earth ash to the catalyst. The above-described washing will remove low levels of these materials. The residue from the extrusion aid is preferably less than a few tenths of a percent by weight, more preferably less than 0.1 wt %.

Methods for preparing catalyst compositions are well known to those skilled in the art and include such conventional techniques as spray drying, pelletizing, extrusion, various sphere-making techniques and the like. The methods of in-extrudate formation of the zeolite/binder described in U.S. Pat. No. 5,558,851 to Miller and in U.S. Pat. No. 5,514,362 can also be used. The entire contents of these patents are incorporated herein by reference.

The relative proportions of zeolite to the binder/matrix can vary widely. Generally the zeolite content ranges from between about 1 to about 99 wt %, and more usually in the range of from about 5 to about 95 wt %, of the dry composite, more typically 50–85 wt %.

Preferably, whole extrudates rather than crushed extrudates or unbound zeolites are used. Bound zeolites reduce the pressure drop through a reactor, provide improved flow rates, and are easier to load and unload. However, the diffusion characteristics of whole extrudates are quite different from those of unbound powdered zeolites. The interaction of a diffusing gas, such as a halocarbon, is different for a powdered versus a bound zeolite. Diffusion differences would also be especially significant if the catalyst evolves materials such as gases or solids, for example during startup. Moreover, the act of binding itself—including selecting binding materials and the binding method—as well as calcining can affect catalyst performance. For example, the binder can interact with the sieve by simply blocking internal and external sites or by chemical interaction (e.g., alkali from a basic sieve like the preferred L-zeolite of the present invention and silica are known to react under thermal and hydrothermal calcination conditions). Moreover, the distribution of impregnated materials may vary considerably on zeolite powder versus bound zeolites. Thus, studies on powders alone cannot be used to predict commercial performance of bound zeolite catalysts.

Group VIIIB and IVA Metals

The catalyst preferably includes at least one Group VIIIB metal, preferably a noble metal (Pt, Pd, Rh, Ir, Ru, Os), and more preferably, platinum. Metal promoters, such as tin and germanium (which belong to Group IVA) and cobalt and nickel (which belong to Group VIIIB), and combinations thereof can also be used. Preferred amounts of metal are 0.1 to 5 wt %, more preferably 0.1 to 3 wt %, and most preferably 0.3 to 1.5 wt %, based on the L-zeolite. Platinum compounds that form positively charged platinum complex ions in solution are the preferred source of platinum. Platinum tetra amine chloride and nitrate are especially preferred.

Additionally, one or more non-platinum group metals such as tin, indium and Group VIIB metals such as rhenium can be added. Examples include Pt/Sn, Pt/Pd, Pt/Ni, and Pt/Re. These metals can be readily introduced into the composite employing a variety of known and conventional techniques, e.g., ion-exchange, incipient wetness, pore fill, impregnation, etc. Care should be taken so that the Group VIII metal, e.g., platinum, is incorporated in a manner that results in excellent and uniform dispersion. The incipient wetness impregnation method is preferred.

Halides

The catalysts are preferably "hiz-cats," also referred to herein as "halided catalysts" or "halided zeolite catalysts". The term "hiz-cat" is intended to include zeolite catalysts that result from adding halogen-containing compounds to, or from halide impregnation of, zeolites, catalyst bases (i.e., bound zeolites) or zeolite catalysts (i.e., zeolites containing catalytic metal). The halides of the hiz-cats are in addition to those that may be incorporated into the catalyst from the catalytic metal source; that is, this halogen addition or impregnation is not just that associated with conventional platinum loading and impregnation, where platinum halides are often used. Nor does this halogen treatment include conventional zeolite ion exchange operations. Zeolite ion exchange sometimes uses a halide salt such as KCl to replace the cations in the zeolite; this ion exchange can leave small amounts of halide on the catalyst. Moreover, the term hiz-cat is not intended to include catalysts where halide is added using alkali halides (e.g., KCl) or alkaline earth halides. Added alkali is believed to be detrimental to hiz-cats performance.

The form in which the halide is present in hiz-cats is unknown, and may be as ionic halide, neutral halide, or it may be part of a compound, such as a silica halide or Pt halide. The term "halide" is used in a broad sense, and is not intended to denote the ionic state of the added halogen or of the halogen associated with the catalyst.

The halide can be chloride, fluoride, bromide, iodide, or combinations thereof. Preferably, the hiz-cat contains chloride and/or fluoride, more preferably both. Especially preferred hiz-cats can be prepared by treating the bound zeolite or bound catalyst with halocarbons such as freons or with other chlorine-containing and/or fluorine-containing compounds, e.g. by impregnation with ammonium chloride and ammonium fluoride. Preferred hiz-cats useful in this invention have high total halide after calcination (this includes all halides, e.g. both chloride and fluoride), i.e., they contain at least about 0.9 wt % halide, preferably at least about 1.1 wt % and more preferably at least about 1.3 wt % total combined halide. More than about 5 wt % halide does not appear to provide significant advantages. When chloride and fluoride are both present, the weight ratio of Cl to F can vary. Preferably it is between 1:10 and 10:1. More preferably chloride and fluoride are added in a weight ratio of about 1:1.

The terms "chloride retensivity" and "retained chloride" denote the residual chloride content of the catalyst after dry-out, reduction and about 300 hr on-stream. Hiz-cats evolve chloride during these steps, especially during reduction. Thereafter, the chloride level on the catalyst remains substantially constant as the catalyst is brought on-stream and operated. After startup, some halide does continue to evolve, but very slowly. Care should be taken not to overheat the catalyst, (i.e., temperatures above about 950° F.) since additional chloride will evolve, and this overheating is not desirable.

Bound hiz-cat performance can be significantly improved by washing, for example with water, before the halide is added. Preferred catalysts retain less of the added chloride than poor catalysts, even though the retained chloride, i.e., the "chloride retensivity," is independent of startup conditions. The sodium content of preferred catalysts is about 0.4 wt %. Preferred catalysts include less than about 0.5 wt % chloride, more preferably less than 0.45 wt % and most preferably less than 0.4 wt % chloride.

Hiz-Cat Preparation

Hiz-cats can be prepared by extruding and then washing either the bound catalyst or the catalyst base before halide addition. Preferably, the catalyst is prepared by:
 (a) preparing a calcined silica-bound zeolite catalyst base;
 (b) washing the bound zeolite catalyst base with an aqueous liquid, and
 (c) incorporating a group VIIIB metal and halogen-containing compound(s) comprising chlorine and fluorine into the washed base to produce a halided zeolite catalyst.

Preferably, the catalyst is prepared using a low alkali, e.g., low sodium, extrusion aid in step (a). The Pt and halogen-containing compounds can be incorporated sequentially or, preferably, simultaneously. A calcined catalyst base is preferably washed before adding the halogen-containing compounds and the Group VIII B metal, e.g., platinum. In this way, these added components are not washed out of the catalyst. The catalyst base is preferably washed with one or more volumes of wash water. The washing desirably removes at least 20%, preferably at least 50%, of the readily removable alkali.

Catalyst performance can also be improved by various ion exchange processes. Cation exchange, such as with potassium and the like, often includes a wash step. Hiz-cat performance is improved when the ion exchange includes a wash step.

Isolation of Aromatic Products

Benzene, toluene and $C_8$ aromatic streams (i.e., xylenes and ethylbenzene) can be recovered using conventional techniques such as distillation and extraction.

The overall process can be practiced in batch operation or in continuous operation.

Generally a reactor dehydrogenates a fraction including predominantly pentanes to form pentenes, metathesizes the pentenes, and rehydrogenates the resulting olefins to form paraffins (molecular redistribution). Following molecular redistribution, the reaction mixture is fractionally distilled to yield a $C_{2-4}$ fraction, a $C_5$ fraction and a $C_6+$ fraction. The $C_{2-4}$ fraction is cracked in a hydrocracker, and the product separated by distillation to yield an ethylene-rich fraction, a propylene-rich fraction and a heavy fraction. The $C_5$ fraction is sent back to the molecular redistribution stage. The $C_6+$ fraction is collected separately.

The following examples will help to further illustrate the invention but are not intended to be a limitation on of the scope of the process.

EXAMPLE 1

Molecular Redistribution of Pentane and Iso-Pentane

A dehydrogenation/hydrogenation catalyst component was prepared by dissolving 0.6758 grams of $(NH_3)_4Pt(NO_3)_2$ (50.01 wt. % Pt) and 3.3557 grams $LiNO_3$ in 52.8 grams of water. The solution was impregnated overnight in 67.58 grams of alumina spheres obtained from Condea Chemie (1.7 mm alumina spheres, 24–42 mesh fraction). The impregnated particles were calcined in air initially at a temperature of 250° F., raised to 700° F. over a period of 5 hours, and held for 8 hours at 700° F. The catalyst component was cooled to room temperature within about 5 hours.

An olefin metathesis catalyst component was prepared by dissolving 2.3125 grams of ammonium metatungstate (90.6 wt. % $WO_3$) in 36.1 grams of water. The solution was impregnated overnight on 26.4 grams of silica gel manufactured by W. R. Grace/Davison (silica gel grade 59, 24–42 mesh fraction). The resulting impregnated material was calcined in the same manner as the dehydrogenation/hydrogenation component.

The molecular redistribution catalyst was prepared by mixing 3.1 cc of the dehydrogenation/hydrogenation component and 0.9 cc of the olefin metathesis component. The catalyst mixture (4.0 cc catalyst volume) was loaded into a ¼ inch stainless steel tube reactor which was mounted into an electric furnace containing three heating zones. The catalyst mixture was first dried in nitrogen flow (100 cc/min.) from room temperature to 400° F. within a period of one hour. The mixture was reduced in hydrogen flow (100 cc/min.) using a temperature program consisting of 400° F. to 900° F. within one hour and holding it at 900° F. for 12 hours. Subsequently the catalyst mixture was purged with a nitrogen flow for about one hour and cooled to the reaction temperature (e.g., 800° F.). The reactor was pressurized the reaction pressure (e.g., 1500–2000 psig) with nitrogen. To start the molecular redistribution reaction, the nitrogen was switched to a hydrocarbon feed consisting of either pentane or iso-pentane which was delivered at a pre-selected feed rate e.g., 2.0 or 4.0 cc/hr).

Two runs were performed for both a pentane and an iso-pentane feed. The results are summarized below in Table 1:

TABLE 1

| Feed/Rxn. Temp. | Pentane, 550° F. | Pentane, 650° F. | i-Pentane, 550° F. | i-Pentane, 650° F. |
|---|---|---|---|---|
| Pressure, psig | 2000 | 2000 | 2000 | 2000 |
| LHSV, $h^{-1}$ | 0.5 | 0.5 | 0.5 | 0.5 |
| Conversion | 56% | 81% | 34% | 54% |
| Yield, wt. % | | | | |
| total C2's | 0.38 | 1.49 | 0.58 | 2.43 |
| methane | 0.02 | .019 | 0.28 | 1.11 |
| ethane | 0.36 | 1.30 | 0.30 | 1.32 |
| propane | 6.55 | 13.93 | 2.11 | 5.25 |
| total C4's | 17.43 | 22.07 | 12.22 | 14.40 |
| n-butane | 17.32 | 21.75 | 1.89 | 3.80 |
| iso-butane | 0.11 | 0.32 | 10.33 | 14.60 |
| n-pentane | — | — | 0.95 | 1.65 |
| iso-pentane | 0.38 | 0.80 | — | — |
| total C6's | 13.08 | 13.24 | 10.78 | 12.38 |
| 2-methyl pentane | 0.24 | 0.55 | 4.10 | 6.18 |
| 3-methyl pentane | 0.21 | 0.47 | 6.49 | 5.96 |
| n-hexane | 12.63 | 12.22 | 0.19 | 0.23 |
| C7+ and unknowns | 18.22 | 29.29 | 7.36 | 17.80 |
| Selectivity, wt. % | | | | |
| total C2's | 0.68 | 1.85 | 1.71 | 4.51 |
| C3 | 11.69 | 17.30 | 6.21 | 9.74 |
| total C4's | 31.10 | 27.41 | 35.94 | 26.71 |
| total C6's | 23.32 | 16.44 | 31.71 | 22.96 |
| C7+ and unknowns | 32.51 | 36.38 | 21.65 | 33.02 |

The results in Table 1 demonstrate that the molecular redistribution reaction was able to convert the pentane and isopentane to $C_{4-}$ and $C_6+$ products, with relatively small amounts of isomerization with a normal pentane feed, and relatively small amounts of normal products with an iso-pentane feed.

While the present invention has been described with reference to specific embodiments, this application is intended to cover those various changes and substitutions that may be made by those skilled in the art without departing from the spirit and scope of the appended claims.

What is claimed is:

1. A process for preparing a $C_{4-}$ and a $C_6+$ product stream from a feedstock including predominantly pentanes, the process comprising;

a) contacting a $C_5$ containing paraffinic feedstock with a catalyst which includes a hydrogenation/dehydrogenation catalyst and an olefin metathesis catalyst under conditions which dehydrogenate the paraffins to olefins, metathesize the olefins, and rehydrogenate the olefins, to provide a product stream, b) isolating a $C_{4-}$ fraction from the product stream, c) isolating a $C_6+$ fraction from the product stream, leaving a fraction including predominantly unconverted pentanes, d) preparing components for gasoline from the $C_{4-}$ fraction by alkylating iso-butane in the $C_{4-}$ fraction with a light olefin feed selected from the group consisting of ethylene, propylene, butenes, pentanes and mixtures thereof, and e) either isomerizing the $C_6+$ fraction or subjecting at least a portion of the $C_6+$ paraffins to a reforming process.

2. The process of claim 1, further comprising isomerizing the $C_{4-}$ fraction.

3. The process of claim 2, further comprising repeating steps a) through c) with unreacted pentanes.

4. The process of claim 1, wherein the $C_6+$ fraction is isomerized.

5. The process of claim 1, wherein at least a portion of the $C_6+$ paraffins is subjected to a reforming process.

6. The process of claim 5, wherein the reforming process is a platforming or rheniforming process.

7. The process of claim 1, wherein the at least a portion of the feedstock is obtained from natural gas.

8. The process of claim 1, wherein at least a portion of the feedstock is obtained from a cracked gas feed.

9. The process of claim 1, wherein at least a portion of the feedstock is obtained from the distillation of crude oil.

10. The process of claim 1, wherein at least a portion of the feedstock is obtained from a hydrocracker.

11. The process of claim 1, wherein at least a portion of the feedstock is obtained from an isomerization unit.

12. The process of claim 1, wherein at least a portion of the feedstock is treated to remove impurities selected from the group consisting of hydrogen, methane, ethane, olefins and heteroatoms.

13. The process of claim 1 wherein the hydrogenation/dehydrogenation catalyst includes at least one metal or a corresponding metal compound selected from the group consisting of iron, cobalt, nickel, ruthenium, rhodium, palladium, osmium, iridium, and platinum.

14. The process of claim 1 wherein the hydrogenation/dehydrogenation catalyst component comprises a noble metal or a compound thereof.

15. The process of claim 14 wherein the noble metal is platinum or palladium or a mixture of platinum and palladium or the compounds thereof.

16. The process of claim 14 wherein the hydrogenation/dehydrogenation component also contains rhenium, tin, germanium, gallium, indium, lead, tin, compounds thereof and mixtures thereof.

17. The process of claim 1 wherein the olefin metathesis catalyst comprises a metal or corresponding metal compound selected from the group consisting of tungsten, molybdenum, tin and rhenium.

18. The process of claim 1, wherein the olefin metathesis catalyst comprises tungsten.

19. The process of claim 1 wherein the hydrogenation/dehydrogenation catalyst includes platinum or a platinum compound and the olefin metathesis catalyst includes tungsten or a compound of tungsten.

20. The process of claim 19 wherein the hydrogenation/dehydrogenation catalyst is a mixture of platinum-on-alumina and the olefin metathesis catalyst is tungsten-on-silica and the volumetric ratio of the platinum component to the tungsten component is greater than 1:50 and less than 50:1 and wherein the amount of platinum on the alumina is within the range of from about 0.01 weight percent to about 10 weight percent on an elemental basis and the amount of tungsten on the silica is within the range of from about 0.01 weight percent to about 50 weight percent on an elemental basis.

21. The process of claim 20 wherein the volumetric ratio of the platinum component to the tungsten component is between 1:10 and 10:1 and wherein the amount of platinum on the alumina is within the range of from about 0.1 weight percent to about 5.0 weight percent on an elemental basis and the amount of tungsten on the silica is within the range of from about 0.1 weight percent to about 20 weight percent on an elemental basis.

\* \* \* \* \*